May 12, 1964  J. J. BAKER ETAL  3,132,667
FLUID COUPLING APPARATUS
Filed June 24, 1959  2 Sheets-Sheet 1
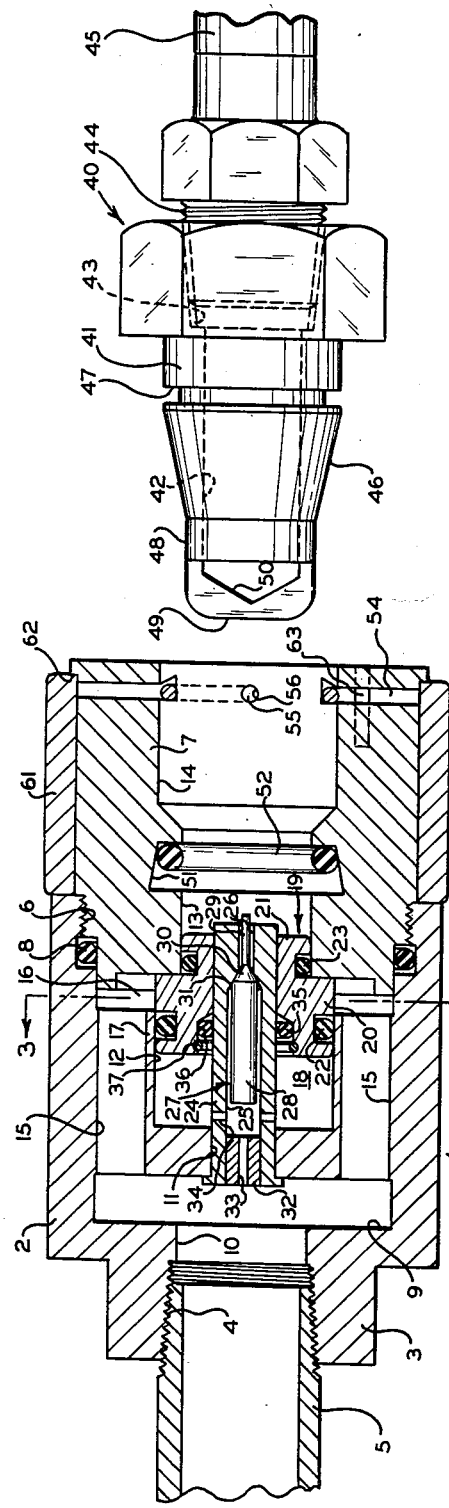
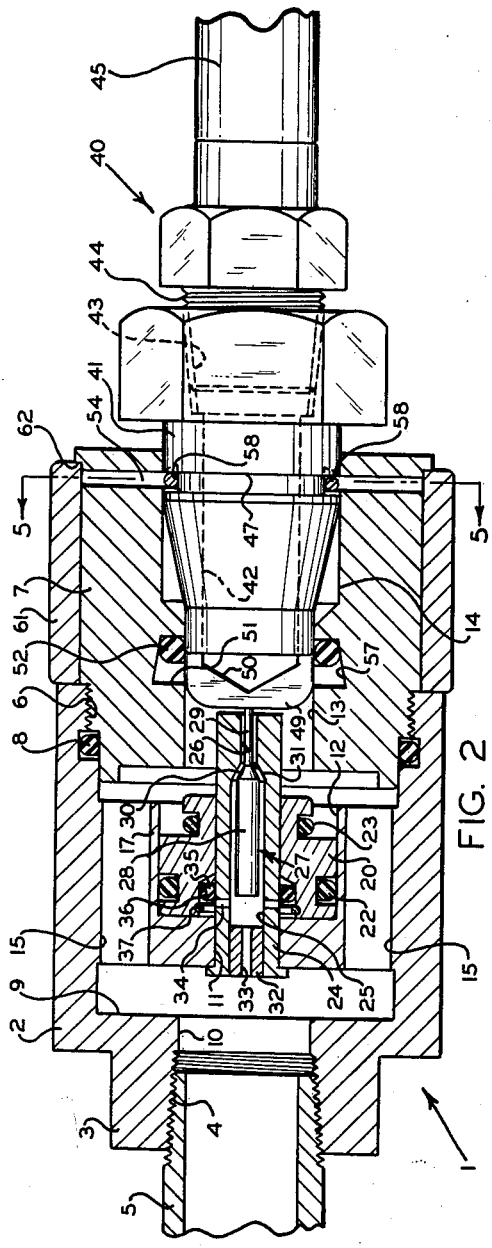
INVENTORS
JOHN J. BAKER
WILLIAM G. BENJEY
BY *Learman, Learman & McCulloch*
ATTORNEYS May 12, 1964  J. J. BAKER ETAL  3,132,667
FLUID COUPLING APPARATUS
Filed June 24, 1959  2 Sheets-Sheet 2

INVENTORS
JOHN J. BAKER
WILLIAM G. BENJEY

BY *Learman Learman & McCulloch*

ATTORNEYS

United States Patent Office 3,132,667
Patented May 12, 1964

3,132,667
FLUID COUPLING APPARATUS
John J. Baker, 420 N. 2nd Ave., and William G. Benjey, 126 Garfield, both of Alpena, Mich.
Filed June 24, 1959, Ser. No. 822,522
3 Claims. (Cl. 137—599.2)

This invention relates to fluid coupling apparatus and more particularly to a separable pneumatic coupling device capable of engagement and disengagement with a minimum of physical effort regardless of the size of the coupling or the pressure of the fluid with which it is used.

Fluid coupling devices of the kind to which the invention relates are well known per se, but not all of them are entirely satisfactory for a number of reasons. One of the principal objections to many of the known couplings available is the difficulty with which they may be engaged and disengaged. This difficulty is due to the fact that, in many existing couplings, it is necessary to overcome the force of the pressure fluid in one part of the coupling when engaging or disengaging the other part. With such couplings, difficulty often is experienced when the separable coupling parts are disengaged because the force of the pressure fluid tends to make them fly apart. Thus, it not only is difficult to maintain control over the coupling parts during disengagement, but there also can be some risk to the operator unless care is exercised to avoid injury during disengagement of the coupling members.

Another disadvantage of known coupling devices is their reliance on springs. The use of springs to control the operation of the valves or coupling devices is, at best, somewhat unreliable due to the fact that the pressure of pressure fluid systems frequently varies over a fairly wide range. Moreover, the springs are separate items requiring manufacture and assembly and also necessitate inspections periodically in order to be certain that they function properly. In addition, the use of springs often results in greater difficulty in coupling and uncoupling the coupling members inasmuch as the springs usually are installed in the known devices in such manner as to complement the force of the fluid pressure.

An object of this invention is to provide fluid coupling apparatus composed of engageable and disengageable members which may be engaged and disengaged with a minimum of physical effort and risk.

Another object of the invention is to provide fluid coupling apparatus wherein the fluid pressure is utilized to assist the engagement of the coupling members.

Another object of the invention is to provide fluid coupling apparatus wherein the valve elements operate independently of forces extraneous to the force of the fluid pressure of the system with which the apparatus is associated.

Another object of the invention is to provide fluid coupling apparatus of simplified design which is economical to manufacture, simple to use, and rugged and durable in operation.

Other objects and advantages of the invention will be pointed out specifically or will become apparent from the following description when it is read in conjunction with the appended claims and the accompanying drawings, in which:

FIGURE 1 is a fragmentary view, partly in side elevation and partly in section, of coupling apparatus formed according to the invention and illustrating the parts in the positions they occupy when the separable elements are disengaged from one another;

FIGURE 2 is a view similar to FIGURE 1, but showing the parts engaged;

Figure 5:
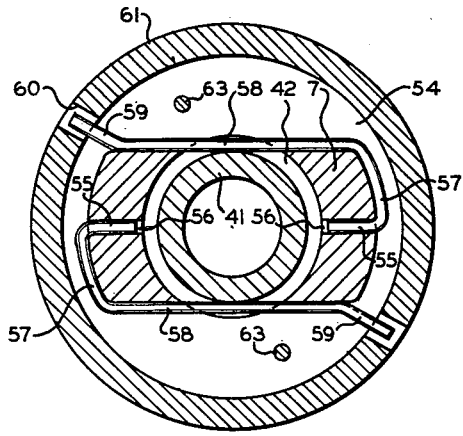
FIGURE 5 is a sectional view taken on the line 5—5 of FIGURE 2 and illustrating the means for retaining the coupling elements in assembled relation.

Apparatus constructed in accordance with the invention comprises a coupling element 1 composed of a first body member 2 having an annular boss 3 at one end which is threaded internally as at 4 for reception of a correspondingly threaded pipe or conduit 5 which may be connected in a conventional manner to a source of pressure fluid such as an air compressor (not shown). The opposite end of the body portion 2 also is interiorly threaded as at 6 for reception of one end of a correspondingly threaded second body member 7. Sealing means such as an O ring 8 may be interposed between the overlapping portions of the body members 2 and 7 so as to prevent the leakage of any pressure fluid therebetween.

The body portion 2 is provided with an annular chamber 9 which communicates with the bore of the conduit 5 through a port 10 extending through the boss 3. The body member 2 is provided with an axial bore 11 which communicates at one end with the chamber 9 and at the other end with an enlarged counterbore 12, the latter having communication with a bore 13 formed in the body member 7. The body member 7 is equipped with an interior chamber 14 which extends to the end of the body portion 7 so as to provide with the bores 11, 12, and 13, and the chambers 9 and 14, communication from end to end of the coupling element 1.

Generally parallel to but radially spaced from the bores 11 and 12 is a plurality of fluid passages 15 which communicate at corresponding ends with the chamber 9 and at the other ends with an annular chamber 16. The passages 15 through the body 2 and the bore 12 form what may be termed a spider 17 located between the chambers 9 and 16, the walls of the spider defining a cylinder 18. Mounted in the cylinder 18 is an annular main valve member 19 having a main body portion 20 received in and corresponding substantially to the diameter of the bore 12. The valve member 19 also includes a projecting portion 21 of reduced diameter and which corresponds substantially to the diameter of the bore 13 in the body portion 7. The valve member 19 is so constructed and arranged that, in one position thereof, the portion 21 projects into the bore 13 whereas the portion 20 blocks or seals the passages 15 from the bores 12 and 13. Sealing means such as O rings 22 and 23 may be seated in recesses formed in the valve body portions 20 and 21, respectively, so as to effect seals at the outer peripheries of the valve member 19.

The valve member 19 is adapted for movement axially of the coupling member 1 and means for mounting the valve member for such movement comprises a generally cylindrical element 24 which is received in the bore 11 and which extends through the bore of the valve element 19. The cylinder 24 is provided with an axial chamber 25 which communicates at one end with a port 26 that is in communication with the bore 13 in the body portion 7. Mounted within the cylinder 24 is a control valve element 27 having a main body portion 28 of somewhat less diameter than the diameter of the chamber 25 and including a stem 29 of less diameter than the diameter of the port 26 and which is of such length as to extend slightly beyond the cylinder 24 when the element 27 is in its seated position as is shown in FIGURE 1. Between the valve portions 28 and 29 is a tapering seat portion 30 which may be provided with a rubber or the like surface and which is adapted to seat upon a correspondingly tapered seat 31 formed between the chamber 25 and the port 26. The opposite end of the cylinder 24 may be partially closed by a plug 32 having an axial port 33 therein having a cross-sectional area corresponding substantially to the cross-sectional area difference between the areas of the port 26 and the valve stem 29.

The chamber 25 of the cylinder 24 is in communication with the interior of the cylinder 18 by means of ports 34 extending radially of the cylinder 24. The location of the ports 34 is such that they are open when the valve 19 is in its closed position as shown in FIGURE 1. To effect a seal between the valve element 19 and the cylinder 24, an O ring 35 may be received in an annular recess 36 formed at the inner periphery of the valve portion 20. To prevent inadvertent removal of the ring 35 from the recess 36, a retainer ring 37 may be located near the mouth of the recess 36.

The construction and arrangement of the parts described thus far are such that when the valve element 19 is in the position shown in FIGURE 1, pressure fluid from the source will be introduced to the annular chamber 9 from which it will pass to the passageways 15. As long as the valve element 19 is in the FIGURE 1 position, however, communication between the passages 15 and the bore 13 is blocked. Therefore, the fluid enters the cylinder chamber 25 via the port 33 and exerts a force on the valve 27 tending to move it towards the right, as viewed in FIGURE 1, to effect sealing engagement between the seat portions 30 and 31. When the valve 27 is in sealing engagement with the cylinder 24, fluid may enter the chamber 18 via the ports 34 and will exert a force on the valve element 19 tending to move it towards the right, as viewed in FIGURE 1, thereby assuring the application of a constant force on the valve element 19 to hold it in its passage blocking position.

The invention also includes a body member designated generally by the reference character 40 which is adapted to be engaged with and disengaged from the element 1. The element 40 comprises a body 41 having a longitudinal bore 42 extending from one end thereof towards the other and communicating with a tapering counterbore 43 which may be interiorly threaded to receive the correspondingly tapered and threaded end 44 of a pressure fluid line 45 adapted for connection at its other end to a tool or other device (not shown) operated by pressure fluid. The body portion 41 includes a tapering, abutment forming portion 46 which is interrupted by a peripheral recess 47, the function of which will be described hereinafter, the portion 46 being joined to an annular portion 48 having a diameter corresponding substantially to the diameter of the bore 13. Secured to the annular portion 48 is a projecting tang or actuator 49 which is adapted to engage and displace the projecting portion of the control valve stem 29 in a manner which will be explained subsequently. The tang 49 has an opening 50 therethrough so as not to obstruct the bore 42 of the coupling member 40.

The construction and arrangement of the coupling 40 are such that the body portion 41 may be telescopingly inserted in the bores 13 and 14 of the body member 7 as is indicated in FIGURE 2. To prevent the possibility of leakage between the bore 13 and the annular portion 48, the element 7 may have a groove 51 therein in which is located a sealing device such as an O ring 52.

Manipulatable means is provided for releasably latching the body members 1 and 40 in engaged position and comprises a pair of similar spring elements 53 located in an annular slot 54 formed in the element 7 near its external end. Each spring member 53 includes an anchor portion 55 received in a radial slot 56 formed in the member 7 and communicating with the bore 14. The anchor portion 55 is joined to a spring arm portion 57 which lies in the slot 54 and which, in turn, is joined to a retaining or latching arm portion 58 which extends transversely of the member 7 and projects into the chamber 14 as is best shown in FIGURE 5. Each retaining portion 58 is joined to an angularly offset extension 59 which extends beyond the body portion 7 and is received in a slot 60 formed in an annular, manipulatable, operating ring 61 which is rotatably mounted on the body member 7. The ring 61 is maintained in position on the body member 7 by the cooperating action of a shoulder 62 formed on the body member 7, and the adjacent end of the member 2, as is best shown in FIGURES 1 and 2.

The spring arms 53 may be prestressed in such manner that, in assembled positions, the portions 58 and 59 normally occupy the positions shown in FIGURE 5. That is, the retaining arm portions 58 will be partially located within the chamber 14 of the body member 7. Thus, when the coupling element 40 is inserted in the coupling element 1, the abutment forming portion 46 of the element 40 will cam the spring retaining arm portions 58 in a generally radially outward direction so as to permit assembly of the coupling elements 1 and 40. When the element 40 has been fully inserted in the element 1, the groove 47 in the part 41 will register with the spring arms 58, whereupon the latter will return to their normal positions and be received in the groove 47 so as to prevent inadvertent separation of the coupling elements.

Figure 6:
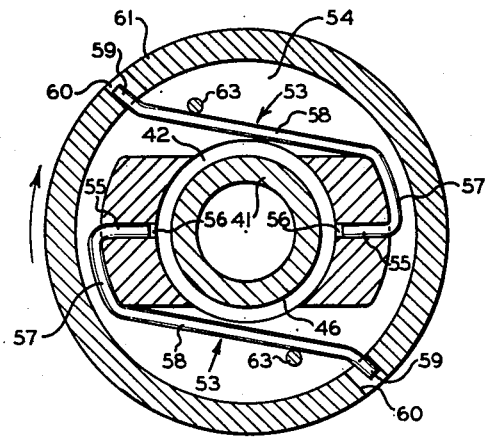
FIGURE 6 is a view similar to FIGURE 5, but illustrating the parts conditioned for disengagement of the separable coupling elements.
Figure 3:
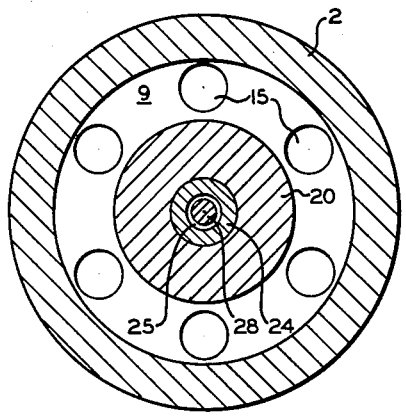
FIGURE 3 is a sectional view taken on the line 3—3 of FIGURE 1.
Figure 4:
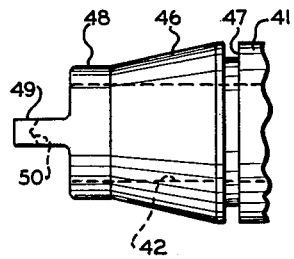
FIGURE 4 is a fragmentary, elevational view of a portion of the apparatus shown in FIGURES 1 and 2, but rotated through 90°.

When it is desired to uncouple the elements 1 and 40 the operating ring 61 may be rotated clockwise, as viewed in FIGURES 5 and 6, whereupon the walls of the slots 60 will engage the extensions 59 and move the spring arm portions 58 and 59 to the positions shown in FIGURE 6 where the arm portions 58 will be free of the groove 46. The coupling elements 1 and 40 then may be separated with ease. In order to avoid undue flexing of the springs 53 during disengagement of the coupling elements, stop pins 63 may be located in the member 7 in such manner as to span the width of the slot 54 and lie in the path of movement of the spring arms 58 to limit their movement under the influence of the operating ring 61.

In describing the operation of the apparatus it first will be assumed that the elements 1 and 40 of the coupling apparatus are disengaged from one another and that the fluid conduit 5 is connected to a source of pressure fluid. In these conditions of the parts, the control valve 27 will seal the port 26 in the cylinder 24 and the valve element 19 will seal the delivery ends of the fluid passageways 15 in the manner described previously. When it is desired to engage the couplings 1 and 40, the latter will be inserted in the chamber 14 and pushed manually into the body 7 until such time as the latch arms 53 snap into the groove 47 and latch the coupling elements in engaged position. In these positions of the parts, the actuator or tang 49 of the coupling element 40 will have engaged the nose of the valve stem 29 and will have pushed the valve 27 in such direction as to unseal the port 26, thereby allowing pressure fluid to pass through the cylinder 24 into the bore 13. As fluid discharges through the cylinder 24 a low pressure area will be established at the interior ends of the ports 34 causing a discharge of fluid from the cylinder 18 through the ports 34 into the cylinder 24, for discharge into the bore 13. Thus, the chamber 18 will be partially evacuated.

At the discharge end of the cylinder 24, the pressure of the fluid will be uniform and will be exerted in all directions. Consequently, a force will be exerted on the valve element 19 tending to move it into the chamber 18. This force, coupled with the partial evacuation of the chamber 18, is sufficient to cause movement of the valve element 19 out of the bore 13 towards the position of the valve 19 indicated in FIGURE 2, whereupon the discharge ends of the passages 15 will be opened to communication with the passage 42 of the coupling element 40 so as to permit pressure fluid to be delivered through the coupling to the discharge line 45. The valve 19 and its control apparatus thus may be termed a fluid motor.

During the engagement of the coupling elements 1 and 40, it will be necessary for the operator to overcome only the force with which the valve 27 is maintained in sealing engagement. Since the cross sectional area of the valve body 28 is rather small as compared to the area of the valve 19, the force required to unseat the valve 27 is not great. Once the valve 27 is opened, the remainder of the operation of the parts is automatic due to the fluid motor action of the valve 19. By the time the valve element 19 is open, the coupling element 40 will be securely retained in the element 1, by means of the latch parts 53 and 47, thereby making it impossible for the force of the pressure fluid to cause the coupling elements to fly apart. Consequently, assembly of the coupling sections 1 and 40 can be effected quite easily and safely regardless of the size of the elements.

When it is desired to uncouple the elements 1 and 40, the operating ring 61 may be rotated to withdraw the arms 53 from latching engagement with the element 40 so as to permit the latter to be withdrawn from the coupling unit 1. As the element 40 is withdrawn from the element 1, pressure fluid entering the cylinder 24 via the port 33 immediately will move the valve body 28 to its sealing position. Immediately thereafter, the fluid will pass through the ports 34 towards the chamber 18 where it first will enter the recess 36 formed in the valve element 19. The introduction of pressure fluid to the recess 36 will initiate movement of the valve element 19 towards its sealing position and as it moves towards that position, fluid may enter the chamber 18 and exert additional force on the valve body 19 so as to move the latter to its sealing position very rapidly. Again, the operation of the parts to seal the coupling element 1 is automatic upon removal of the coupling element 40.

The operation of the valve structure of the invention is dependent only on fluid pressure as contrasted to spring operation. Thus, there is no possibility of faulty operation of the apparatus due to an unfavorable unbalanced condition between fluid pressure and spring pressure.

The disclosed embodiment is representative of a presently preferred form of the invention, but is intended to be illustrative rather than definitive thereof. The invention is defined in the claims.

What is claimed is:

1. Fluid coupling apparatus comprising a first body member adapted for connection to a source of pressure fluid; a second body member adapted for engagement with and disengagement from said first body member; communicating fluid passage means in said members for permitting fluid to flow therethrough; main valve means in one of said body members; means mounting said valve means for movements in response to changes in fluid pressures from opposite sides of the latter from and to a position in which said valve means seals said fluid passage means; control valve means in said one of said body members formed in part by said mounting means and being operable to effect changes in fluid pressures on opposite sides of said main valve means to control the movements of said valve means; and actuator means on the other of said members engageable and disengageable with said control valve means upon engagement and disengagement, respectively, of said members for operating said control valve means, said control valve means comprising a chamber in which said main valve means is mounted, a cylinder adapted for communication with said source and being in communication with said chamber, said cylinder also being adapted for communication with said fluid passage means, and a valve element in said cylinder operable in response to engagement with and disengagement from said actuator means to enable fluid to pass from said cylinder to said chamber or to said fluid passage means, respectively.

2. The apparatus set forth in claim 1 wherein said valve means is annular and is mounted on said cylinder.

3. The apparatus set forth in claim 1 including cooperable means carried by said members for releasably locking them in engaged relation.

References Cited in the file of this patent

UNITED STATES PATENTS

| | | |
|---|---|---|
| 2,115,195 | Cole | Apr. 26, 1938 |
| 2,131,740 | Kappelman | Oct. 4, 1938 |
| 2,327,611 | Scheiwer | Aug. 24, 1943 |
| 2,345,306 | Van der Werff | Mar. 28, 1944 |
| 2,357,657 | Jensen | Sept. 5, 1944 |
| 2,370,182 | Morrow et al. | Feb. 27, 1945 |
| 2,440,452 | Smith | Apr. 27, 1948 |
| 2,457,251 | Main | Dec. 28, 1948 |
| 2,671,516 | Grant | Mar. 9, 1954 |
| 2,752,946 | Towler et al. | July 3, 1956 |
| 2,761,469 | Hansen | Sept. 4, 1956 |
| 2,805,089 | Hansen | Sept. 3, 1957 |
| 2,815,921 | Bigelow | Dec. 10, 1957 |